Aug. 6, 1968  E. JUCKER  3,395,566
TIMEPIECE TESTER AND METHOD
Filed July 20, 1965  2 Sheets-Sheet 1

INVENTOR
ERICH JUCKER
BY
Curtis, Morris + Safford
ATTORNEYS

United States Patent Office 3,395,566
Patented Aug. 6, 1968

3,395,566
TIMEPIECE TESTER AND METHOD
Erich Jucker, La Chaux-de-Fonds, Switzerland, assignor to Le Portescap S.A., La Chaux-de-Fonds, Switzerland
Filed July 20, 1965, Ser. No. 473,437
Claims priority, application Switzerland, Aug. 31, 1964, 11,333/64
14 Claims. (Cl. 73—6)

ABSTRACT OF THE DISCLOSURE

There are disclosed herein a method and apparatus for the instantaneous optical checking of timepiece movements and the like by: counting the successive pulses of a predetermined oscillating frequency; indicating each pulse on one of a plurality of optical readout means; sensing each pulse or beat of a timepiece movement being checked; and using each successive beat to determine the particular optical readout means to which each successive oscillating frequency pulse is directed.

---

This invention relates to a method and apparatus for instantaneous optical checking of the running of timepiece movements such as watches and the like.

Various types of apparatus to check the running of timepiece movements are known. Some of these chronocomparators are based on graphical reading; others comprise digital counting devices which indicate the daily rate of the timepiece movement by counting a number of standard cycles included in a period of time equal to a whole number of cycles of oscillation of the movement. However, such apparatus permit reading the daily rate only after an elapsed minimum period of time, e.g., of several seconds, necessary for making the measurement. As a result, they cannot be used without an appreciable loss of time when adjusting the regulation of a large number of timepiece movements.

For that particular use, there has previously been proposed apparatus using a stroboscopic measuring system. However, since the beat frequency of the movements to be checked is of the order of 5 to 6 alternations per second, in order to obtain a sufficiently precise reading, the duration of the flashes of the stroboscope must be very short as compared with the dark period between two alternations. Therefore, reading the result on such apparatus becomes tedious and fatiguing for the operator.

An object of the present invention is to overcome those drawbacks and to provide a new method and apparatus for instantaneous optical checking of the daily rate of a timepiece movement which permits an extremely rapid and precise verification of its rate, and particularly of large numbers of movements whose rates are being regulated, e.g. in a watch-making factory.

The method in accordance with the invention is characterized by continuously counting the impulses given off by an oscillator device as a frequency equal to the product $N.B_1.n_1$ in which N is a fixed number of optical indicators in the apparatus used, $B_1$ is the number of beats per second of the timepiece movement to be checked and $n_1$ is an arbitrary number selected as a function of the sensitivity of reading of the apparatus. The number of beats counted is transferred by a transfer pulse given off upon each beat of the movement to a memory device having N optical indicators to memorize the count and indicate it optically until the following beat.

The apparatus for carrying out this method comprises, in accordance with the invention, at least one microphone with a head carrying the movement to be checked and a sound amplifier, and an oscillator device connected to a pulse counter. The amplifier gives off, upon each beat, an impulse which serves to transfer the result of the counting to a memory device provided with the luminous signal lamps so that the result is signaled optically by one of the luminous signal lamps during a time interval included between two successive beats.

Figure 1:
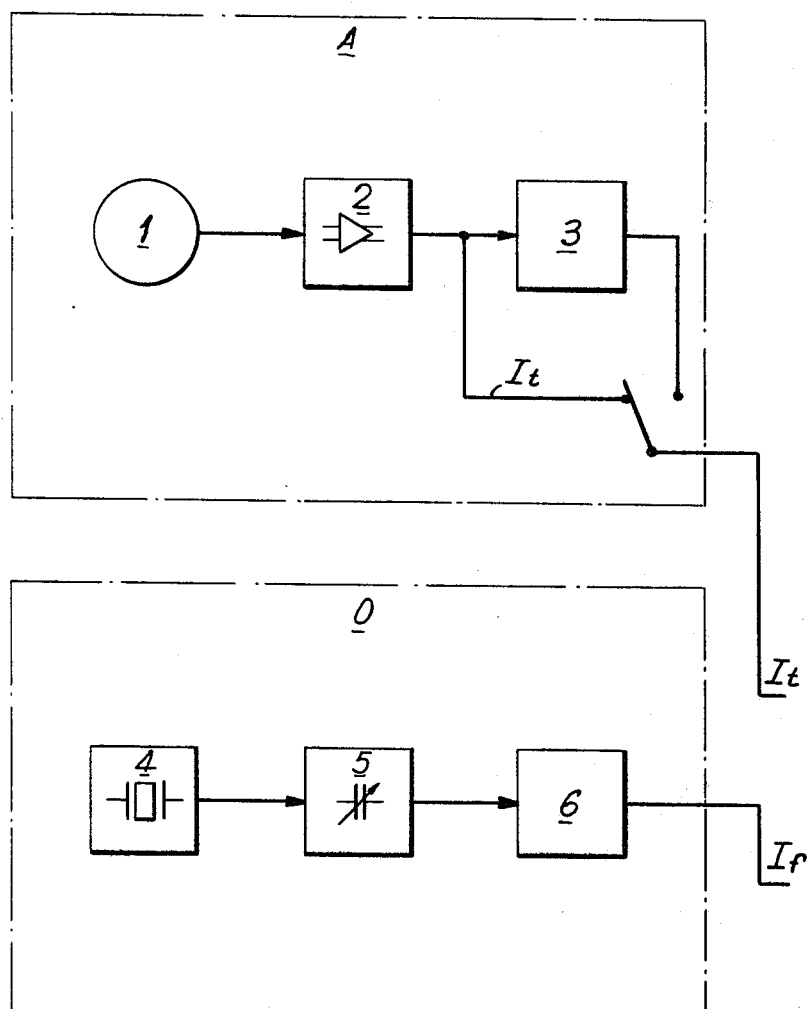
Figure 2:
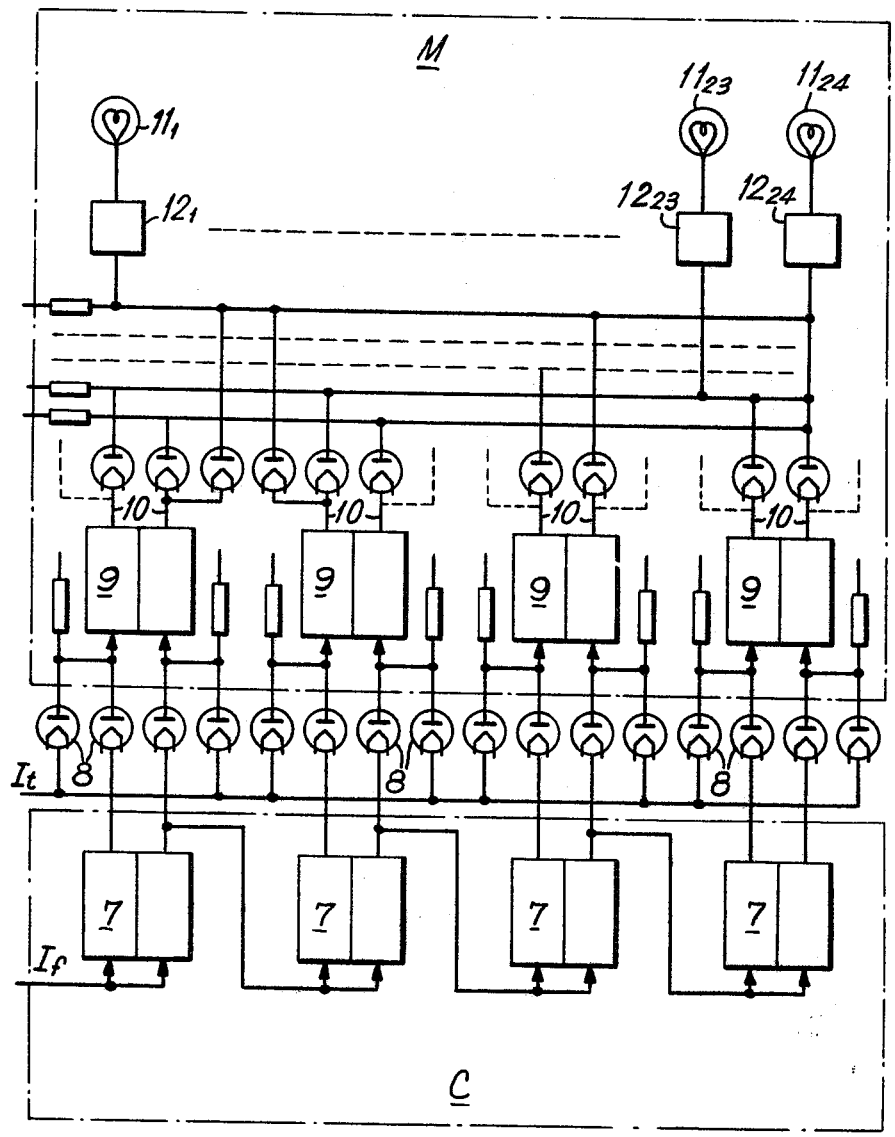

The accompanying drawings show schematically and by way of example one embodiment of the apparatus, FIGURE 1 and FIGURE 2 each showing a partial diagram thereof.

The apparatus represented in the drawings comprises four main elements: in FIGURE 1 a microphone with a sound amplifier designated generally as A and an oscillator group having a set frequency with an electronic frequency changing device and one or more frequency dividers designated generally by O; in FIGURE 2 a pulse counter designated generally by C and a memory device with luminous signal lamps designated generally by M.

The microphone component A comprises a microphone head 1 provided with a clamping device (not shown) to hold a timepiece movement to be checked and with a piezo-electric device, a sound amplifier 2 and a beat divider 3. The amplifier 2 is connected by a line $I_t$ to the counter device C to supply to the latter the transfer pulses given off upon each beat of the movement placed on the microphone head 1.

The oscillator group O comprises a quartz oscillator 4, or other oscillator of set frequency, an electronic frequency changing device 5 and one or more frequency dividers 6 connected by a line $I_f$ to the counter C. The latter comprises a number of counting circuits comprising triggers 7 and diodes 8. The counter C is connected at its input to the line $I_f$ of the oscillator group O and at its output by the output of its counting circuits to the memory unit M which comprises a number N of transistorized circuits comprising conventional flip-flops 9 and the circuits 10 whose outputs are connected by inverters 12 to a number N of luminous signal lamps 11.

These luminous signal lamps, preferably of a number $N=24$, may be arranged on a straight or curved line, and most advantageously in a circle, in the front wall of a cabinet housing the apparatus.

The method and operatioin of the apparatus just described is as follows: the pulses supplied by the oscillator group O are counted continuously in the counter C which may display the figures 1 to N, for example, 1 to 24. The frequency of the oscillator is selected in accordance with the formula $$f = N.B_1.n_1$$

in which $B_1$ is the number of beats per second, for example, $B_1=6$, of the timepiece movement to be checked placed on the microphone heat 1, $n_1$ is whole number selected arbitrarily as a function of the sensitivity of the reading of the apparatus, for exmple, $n_1=275$. Therefore, the frequency is, for example, $24.6.275 = 39,600$ cycles per second.

Upon each beat of the movement being checked, the counter C indicates the same figure if the daily rate of the movement is zero, that is, if the daily rate is neither fast nor slow. If the daily rate is positive, that is, if the movement is fast, the counter C indicates upon each beat a smaller figure than the previous figure. If the daily rate is negative, that is, if the movement is slow, the counter indicates upon each beat a higher figure than the one indicated previously.

It is practically impossible to effect a reading of the counter C during a cycle of the frequency $f$ of the oscillator. The counter C, therefore, is associated with a memory device M provided with luminous signal lamps $11_1$, $11_2$ ... $11_N$. Upon each beat of the movement, the amount indicated by the counter is memorized until the following beat. That is, the luminous indicator 11 corresponding to the figure indicated by the counter remains lit for the entire period of time between two beats. Each beat of the movement produces at the output of the amplifier 2 a short transfer pulse as a signal to the counter C and, by means of the logical circuits of the memory M, the figure supplied by the counter C is instantaneously transferred to the respective luminous signal lamps.

The speed of displacement of the luminous spot in positive or negative direction, that is, the rate at which successive luminous signal lamps are lit and then unlit, for instance clockwise or counterclockwise if the signal lamps are arranged in a circle, is proportional to the daily rate of the watch movement being checked. The speed depends principally on the selection of the factor $n_1$, e.g. 275. To reduce or increase the sensitivity of the reading of the apparatus, the value of $n_1$ is made larger or smaller, that is, the frequency $f$ of the oscillator 4 is increased or decreased. To reduce this frequency, the oscillator group comprises one or more frequency dividers 6 which make it possible to divide the set frequency of the oscillator by, for instance, 2 or 5. Thus, it is possible optically to check the daily rate of a movement and also to measure it with a certain approximation, and accordingly to control the timing of the movement.

The light spot does not move on the optical indicator, that is, the particular luminous signal lamp 11 lit does not change, if the timepiece movement has a daily rate of zero. To avoid errors in interpretation in the case of zero displacement of the light spot, the apparatus can be provided with a special indicator which preferably blinks in the tempo of the movement beats and which goes out when the movement is stopped for any reason during the timing. The blinker can be placed in the center of the circle formed by the luminous signal lamps.

The electronic frequency change device 5 makes it possible to vary the frequency $f_0$ of the oscillator 4 by a fraction of $\frac{1}{1440}$ of its value, which corresponds to a daily rate of ± one minute.

For greater precision of the reading of the daily rate, the beat divider 3 makes possible the elimination periodically of a certain number of beats, e.g. one out of every two transfer pulses.

The apparatus could, of course, be connected to two or more independent microphone devices A, or microphone heads 1, which are separately switched to the counter C in any order, making it possible to check several timepiece movements, one after another.

It should of course be understood that numerus modifications and changes in the embodiments illustrated and described can be made by persons skilled in the art without departing from the scope of the invention as defined in the appended claims.

I claim:

1. Apparatus for instantaneous optical checking of the daily rate of a timepiece movement which comprises a microphone head for sensing the beat of the movement to be checked and for developing a transfer pulse, means for amplifying said transfer pulse, an oscillator, counting means for counting the oscillations of said oscillator, memory means having a plurality of optical readout means, transfer means to transfer a count signal from said counting means to a readout means of said memory means, circuit means to transmit said transfer pulse to said transfer means to transfer said count signal, said memory means retaining said count signal between successive pulses.

2. Apparatus as defined in claim 1 wherein said oscillator has a fixed frequency.

3. Apparatus as defined in claim 1 wherein said oscillator is a quartz oscillator of fixed frequency and further comprises an electromechanical frequency changing means.

4. Apparatus as defined in claim 1 which further compises a frequency divider means between said oscillator and said counting means for dividing the oscillations of said oscillator.

5. Apparatus as defined in claim 1 which further comprises a pulse divider between said amplifying means and said transfer means.

6. Apparatus as defined in claim 1 which further comprises a plurality of microphone heads each for sensing the beat of a movement and switching means to switch the transfer pulses from said microphone heads individually to said amplifying means.

7. Apparatus as defined in claim 1 wherein said optical readout means are lamps.

8. Apparatus for instantaneous checking of the rate of a device having a regular frequency of operation which comprises sensing means having an output signal responsive to said regular frequency of operation, oscillator means having an output of a pre-determined oscillator frequency, counting means having an output signal responsive to said oscillator frequency output, memory means having a plurality of readout means responsive to said counting means output signal, said memory means including circuit means responsive to said sensing means output signal operably connecting each successive counting means output signal to one of said memory readout means.

9. Apparatus as defined in claim 8 wherein said device having a regular frequency of operation is a horological instrument.

10. Apparatus as defined in claim 8 wherein said oscillator means has a variable frequency.

11. Apparatus as defined in claim 8 wherein said oscillator means includes an oscillator frequency divider.

12. Apparatus as defined in claim 8 wherein said memory means readout means are optical readout means.

13. Apparatus as defined in claim 8 wherein said sensing means having an output signal is a microphone head and an amplifier.

14. Apparatus as defined in claim 13 wherein said sensing means includes a frequency divider for said regular frequency output signal.

References Cited

UNITED STATES PATENTS

| | | | |
|---|---|---|---|
| 2,752,775 | 7/1956 | Hetzel | 73—6 |
| 2,782,627 | 2/1957 | Hetzel | 73—6 |
| 3,183,706 | 5/1965 | Ellison | 73—6 |
| 3,238,764 | 3/1966 | Greiner | 73—6 |

DAVID SCHONBERG, *Primary Examiner.*

N. B. SIEGEL, *Assistant Examiner.*